(12) United States Patent
Hassdenteufel et al.

(10) Patent No.: US 7,562,775 B2
(45) Date of Patent: Jul. 21, 2009

(54) PACKAGING FOR LARGE ANTI-FRICTION BEARINGS

(75) Inventors: Martin Hassdenteufel, Adelsdorf (DE); Steffen Heinrich, Erlangen (DE); Michael Kittel, Schweinfurt (DE)

(73) Assignee: Schaeffler KG, Herzogenaurach (DE)

( * ) Notice: Subject to any disclaimer, the term of this patent is extended or adjusted under 35 U.S.C. 154(b) by 173 days.

(21) Appl. No.: 11/576,551

(22) PCT Filed: Sep. 20, 2005

(86) PCT No.: PCT/EP2005/010096

§ 371 (c)(1),
(2), (4) Date: Apr. 20, 2007

(87) PCT Pub. No.: WO2006/037457

PCT Pub. Date: Apr. 13, 2006

(65) Prior Publication Data

US 2008/0047853 A1   Feb. 28, 2008

(30) Foreign Application Priority Data

Oct. 5, 2004   (DE) .................. 10 2004 048 286

(51) Int. Cl.
*B65D 85/58*   (2006.01)
(52) U.S. Cl. .................. 206/318; 206/303; 206/565
(58) Field of Classification Search .......... 206/318, 206/303, 304, 509, 511, 560, 565, 477, 482; 211/23, 50, 59.1
See application file for complete search history.

(56) References Cited

U.S. PATENT DOCUMENTS

| | | | |
|---|---|---|---|
| 2,621,807 A | * | 12/1952 | Rendich .................. 211/50 |
| 3,089,964 A | | 5/1963 | Bruce et al. |
| 3,247,955 A | | 4/1966 | Buck |
| 3,318,443 A | * | 5/1967 | Hillis .................. 242/588.6 |
| 4,191,291 A | * | 3/1980 | Brown .................. 206/565 |
| 5,346,065 A | * | 9/1994 | Dunbar et al. .......... 206/303 |
| 5,447,234 A | * | 9/1995 | Faulstick et al. ........ 206/565 |
| 5,450,961 A | | 9/1995 | Gottfried et al. |
| 5,685,429 A | * | 11/1997 | Myers .................. 206/565 |
| 5,755,323 A | | 5/1998 | Zahn et al. |
| 2005/0274634 A1 | * | 12/2005 | Christmas ............. 206/303 |

FOREIGN PATENT DOCUMENTS

DE   8018779   10/1980

(Continued)

*Primary Examiner*—Luan K Bui
(74) *Attorney, Agent, or Firm*—Volpe and Koenig, PC

(57) ABSTRACT

Packaging (1) for transporting and handling large anti-friction bearings (15) is provided. The packaging (1) includes a lower part (2) and an upper part (3) that can be fitted over each other and define a region for receiving at least one large anti-friction bearing (15). An outer envelope surface of the large anti-friction bearing (15) is surrounded by a holding element (12) that can be fixed to a plurality of spaced-apart peripheral points. The position of the holding element (12) detachably connected to the lower part (2) can be modified such that the distance of the holding element in relation to a central point of the packaging (1) can be increased or decreased. The packaging (1) is advantageous in that different positioning of the holding element(s) (12) enables large anti-friction bearings (15) with different diameters to be received therein.

15 Claims, 10 Drawing Sheets

FOREIGN PATENT DOCUMENTS

| | | |
|---|---|---|
| DE | 3412661 | 10/1985 |
| DE | 9409451.9 | 11/1994 |
| DE | 40107626.1 | 4/2002 |
| DE | 40107641.5 | 4/2002 |
| DE | 40203397.3 | 8/2002 |
| GB | 1040000 | 8/1966 |

* cited by examiner

PACKAGING FOR LARGE ANTI-FRICTION BEARINGS

BACKGROUND

The invention relates to packaging for transporting and handling large anti-friction bearings, said packaging including a lower part and an upper part, which can be stacked one inside the other and which define a region for receiving at least one large anti-friction bearing between them. In the sense of the invention, the term large anti-friction roller is interpreted such that it also includes its bearing components, such as, for example, a bearing inner ring or a bearing outer ring. However, the invention appears to be applicable also for completely different kinds of rotationally symmetric parts.

Those skilled in the art understand that large anti-friction bearings include bearing units with a diameter approximately in the range between 360 and 610 mm. Due to these large dimensions, bearing weights of 30 kg and more are produced. It is obvious that such large anti-friction rollers must be packaged for transport accordingly, in order to be able to handle them safely.

In connection with this, it is generally known that such bearings are packaged in wooden boxes, wherein the anti-friction bearing is either wrapped with plastic straps or protected with the help of bags and corrugated cardboard before being inserted into the box. This type of packaging, however, requires complicated packaging means preparation and is therefore expensive. For example, the winding process is very time intensive. In addition, the wooden boxes are adapted to the appropriate outer dimensions of the large anti-friction bearing and a lot of cushioning material is used accordingly, which in turn must be disposed of.

From the German Design Patent Applications No. 401 07 626, 401 07 641, 401 07 642, 402 03 397, containers for bearings and their parts have become known, which consist of a lower part and an upper part. Both parts can be stacked one inside the other and define a space for receiving the large anti-friction bearing between them.

It is disadvantageous that such bearing containers always have to be adapted to the bearing size that is used. This is realized in that inserts that hold the bearing are provided in the bearing container. These inserts are adapted to the corresponding bearing sizes. Consequently, the bearing manufacturer must keep a plurality of differently dimensioned inserts in storage, which in turn puts an unnecessary load on the entire packaging in terms of costs.

SUMMARY

Starting from the known disadvantages of the state of the art, the invention is based on the objective of providing packaging for large anti-static bearings, which can be used universally.

In order to meet the stated objective according to the invention, the outer surface of the large anti-friction bearing is encompassed by a holding element that can be locked at several circumferential positions spaced apart from each other, wherein the holding element is detachably connected to the lower part and can be changed in its position such that its distance can be increased or decreased in relation to a center point of the packaging.

The advantage of the solution according to the invention lies in that bearings with different dimensions can be held by the same packaging. This is enabled in that the holding element encompasses the large anti-friction bearing or a bearing component, for example, the anti-friction bearing outer ring, at several circumferential positions spaced apart from each other, that can be changed in position. This means that the holding element is connected to the bottom part as a function of the corresponding circumference of the large anti-friction bearing at certain positions, so that it contacts its outer surface. Now if a larger or smaller anti-friction bearing is held by the same packaging, then the holding element is offset accordingly, so that its distance relative to the center point of the packaging increases or decreases and it always contacts the outer surface of the corresponding large anti-friction bearing. In this way, the large anti-friction bearing is encompassed at various circumferential positions and is fixed reliably in the packaging. Fixing the large anti-friction bearing in the packaging is especially important, because this is transported selectively with street vehicles, rail vehicles, ships, or airplanes and is thus exposed to a wide range of movements.

Additional advantageous constructions of the invention are described in detail below.

According to one embodiment of the invention, the holding element is connected to the bottom part through a positive and/or non-positive fit. Advantageously, a positive-fit connection is preferred, because in this way, the holding element and bottom part can be separated easily.

An especially advantageous variant of the holding element includes an eccentrically offset pin arranged on a top side of a circular base plate, while a bottom side of the base plate is provided with a central cylindrical peg. The base plate can now be inserted in various circumferential positions into the bottom part, so that the eccentrically offset pin can move on a circular path and can be locked at any position of its circular path, so that a different distance can always be set in relation to a center point of the packaging.

It has proven advantageous in this connection when the circular base plate is provided on its outer surface with gear teeth, which engage in an associated circular free space of the bottom part likewise provided with gear teeth. In this way, through a corresponding positive-fit connection it is guaranteed that the base plate is locked in the position, at which the eccentrically offset pin encompasses the outer surface of the large anti-friction bearing.

According to another feature of the invention, the top side of the circular base plate is provided with scaling that can be brought into alignment with a marking in the side wall of the first free space. The alignment of the scaling and marking ensures that the holding element can be positioned with its eccentrically offset pin exactly at the position, at which the outer surface of the corresponding large anti-friction bearing extends.

It has proven advantageous when the cylindrical peg is provided on its end with a positive-fit element, which engages in the bottom part with an associated positive-fit element. Therefore, the situation in which the holding element lies loosely in the unloaded state, i.e., without a large anti-friction bearing, is prevented.

An additional feature can be provided in that the inside of the lower part and/or the upper part is provided with vertical through holes. These through holes ensure an increased stability of the upper and lower part, which must absolutely also be provided in view of the weight of the large anti-friction bearing. The type of vertical through holes is arbitrary, i.e., in the foreground is merely the stability.

The through holes are formed by parallel connecting pieces, which are engaged with each other in longitudinal and transverse rows. In another construction, the through holes are formed by connecting pieces spaced apart from each other in the radial direction and arranged in the shape of a circle, wherein connecting pieces are arranged parallel to a side edge at least at one circumferential position.

According to another feature of the invention, the upper and/or the lower part shall be provided on its inside with a central release position. This release position has significant importance, especially for the lower part, because it is used for removing the large anti-friction bearing. This is performed in that, with a lifting means, the large anti-friction bearing is gripped from beneath starting at the release position and in this way can be removed.

According to another feature of the invention, the lower part is provided on its outer side with projecting stacking elements that engage in associated recesses on the top side of the upper part. As the name suggests, the stacking elements ensure that a secure stacking of packages is possible. Either one package is stacked precisely over the other package or one package is stacked over two packages with a gap. The construction of the stacking elements is secondary, i.e., these can have different shapes.

In one embodiment, the stacking elements have a cylindrical shape and engage in circular recesses. Another embodiment provides for stacking elements with a rectangular shape and have a circular segment-like projection.

As an additional feature of the invention the top side of the upper part and the bottom side of the lower part shall be provided with release positions for receiving a tensioning means. These tensioning means ensure that the upper part cannot be detached from the lower part of the package.

The package should be produced from a plastic that is resistant to lubricants and anti-corrosion agents. This is necessary because the packaging material, in order to be reusable, may not be damaged by the mentioned materials even for very long transport times or for very long storage times.

Additionally, at least the upper part of the packaging is produced from a transparent plastic. This is advantageous because it allows visual inspection of the contents of the packaging in an uncomplicated way without disassembling the packaging each time.

Additionally, the side walls of the lower part and upper part should overlap in their height extent. The advantage of this variant lies in that not only large anti-friction bearings of different diameter, but also different axial width, can be housed in the packaging. The wider the anti-friction bearing in the axial direction, the smaller the overlap of the side walls of the lower part and upper part, because the upper part is practically lifted from the bearing. In other words, the distance of the base plate of the lower part from the base plate of the upper part is determined by the axial width of the load.

The invention is explained in more detail using embodiments below.

BRIEF DESCRIPTION OF THE DRAWINGS

Shown are.

DETAILED DESCRIPTION OF THE PREFERRED EMBODIMENTS

Figure 1:
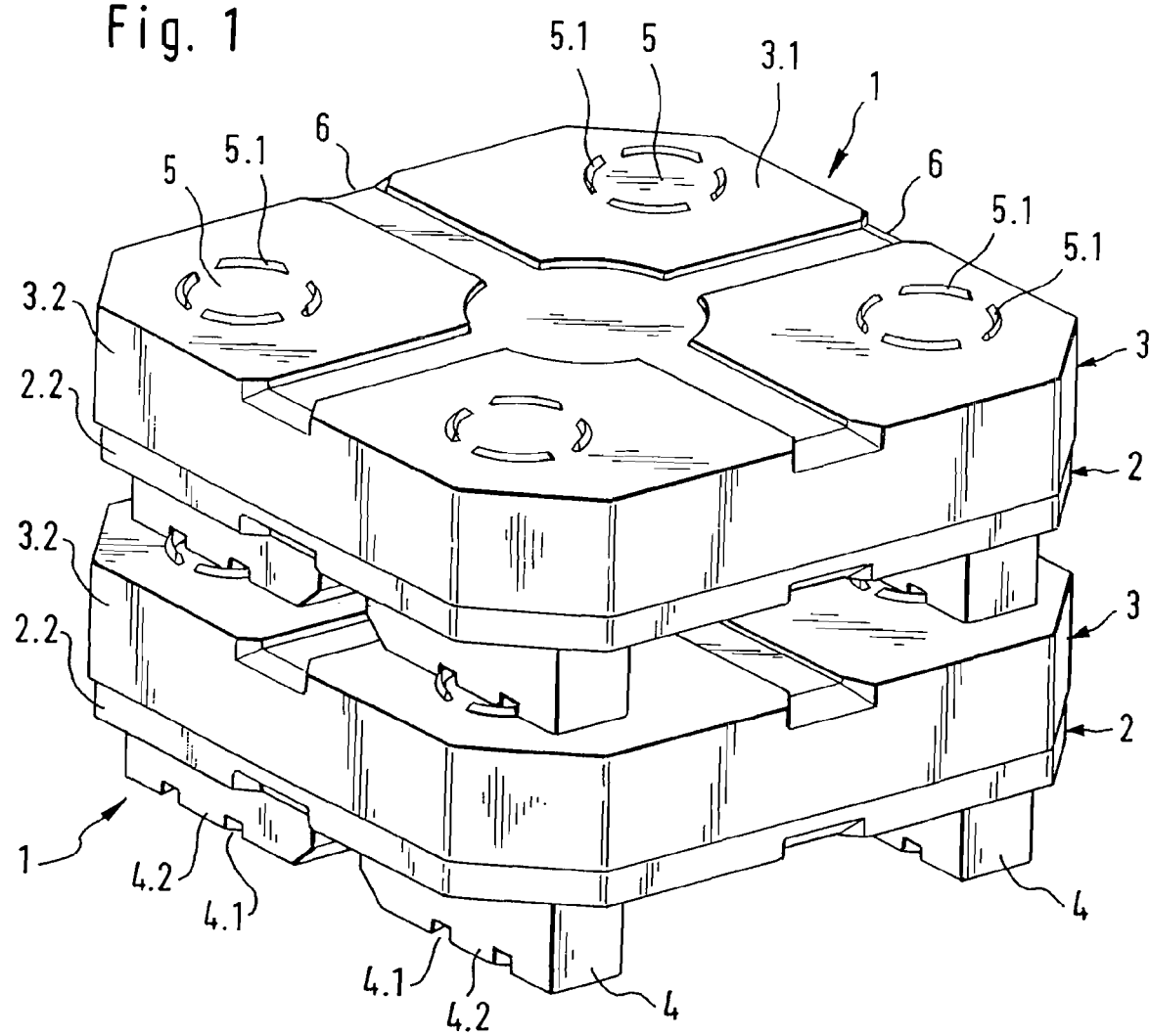
FIG. 1 a view of two packages stacked one above the other.
Figure 2:
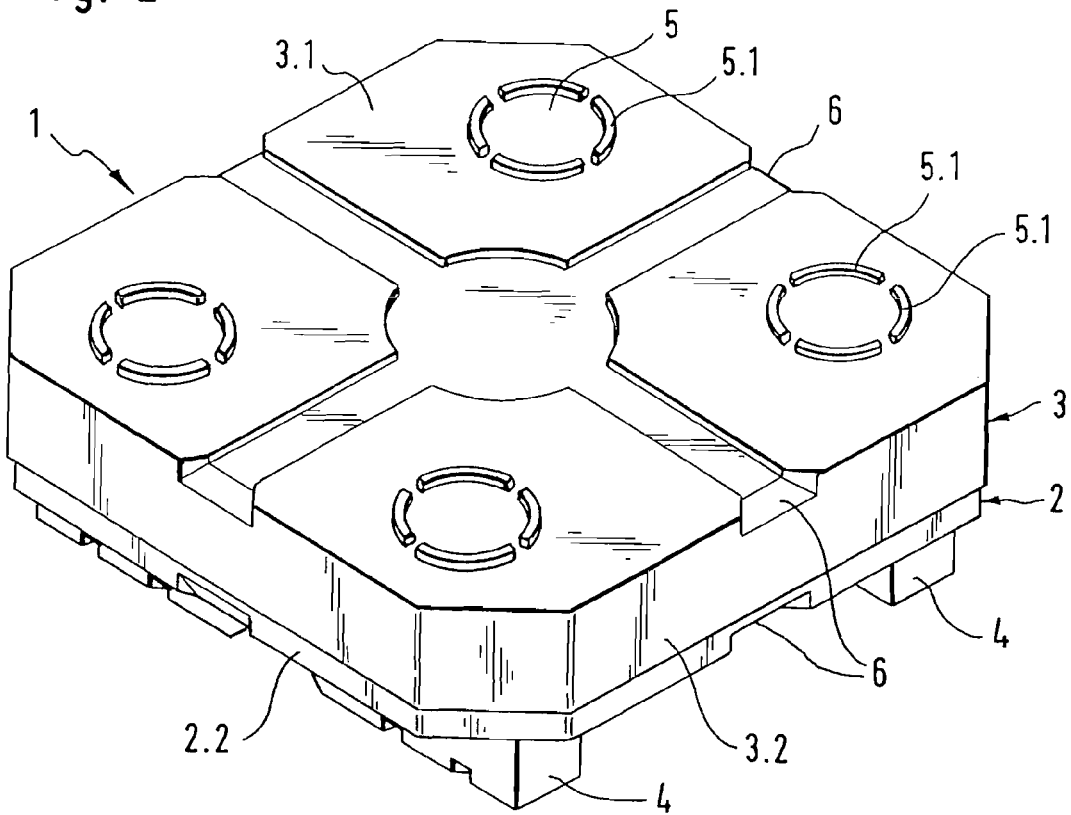
FIGS. 2, 3 plan views from above and from below a package.
Figure 3:
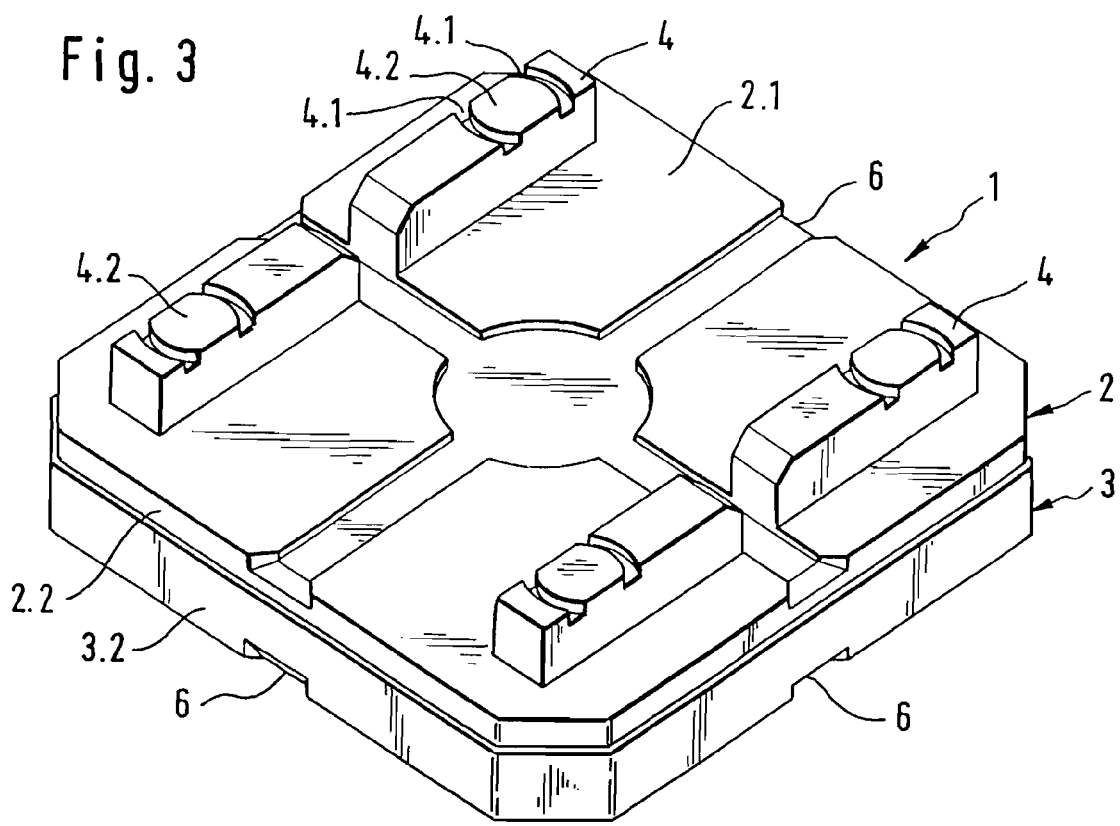

The packaging 1 shown in FIGS. 1, 2, and 3 is comprised of a lower part 2 and the upper part 3, which define a space that cannot be seen in these views for receiving a large anti-friction bearing between them. Both the lower part 2 and also the upper part 3 are comprised of a base plate 2.1, 3.1, from which rectangular side walls 2.2, 3.2 extend upwards and downwards, which are tailored to each other so that the lower part 2 and upper part 3 can be stacked one inside the other, similar to the principle of a cake box. The lower part 2 is provided with stacking elements 4, which have an approximately rectangular construction and which each have arc-shaped recesses 4.1, so that an essentially circular segment-shaped projection 4.2 is formed. Associated recesses 5, which are defined by four arc-shaped beads 5.1, are formed on the upper part 3. The stacking element 4 and associated recess 5 must now be tailored to each other to prevent slippage of the packages 1 arranged one above the other according to FIG. 1. This is performed in that the bead 5.1 of the upper part 3 engages in the arc-shaped recess 4.1 of the stacking element 4 of the lower part 2. As can be seen further from the mentioned figures, both the top side of the upper part 3 and also the bottom side of the lower part 2 are provided with release positions 6, which cross at the center in the present case. These are used for receiving a tensioning means, for example, a strap, and ensure that the upper part 3 cannot detach from the lower part 2 of the package 1.

Figure 4:
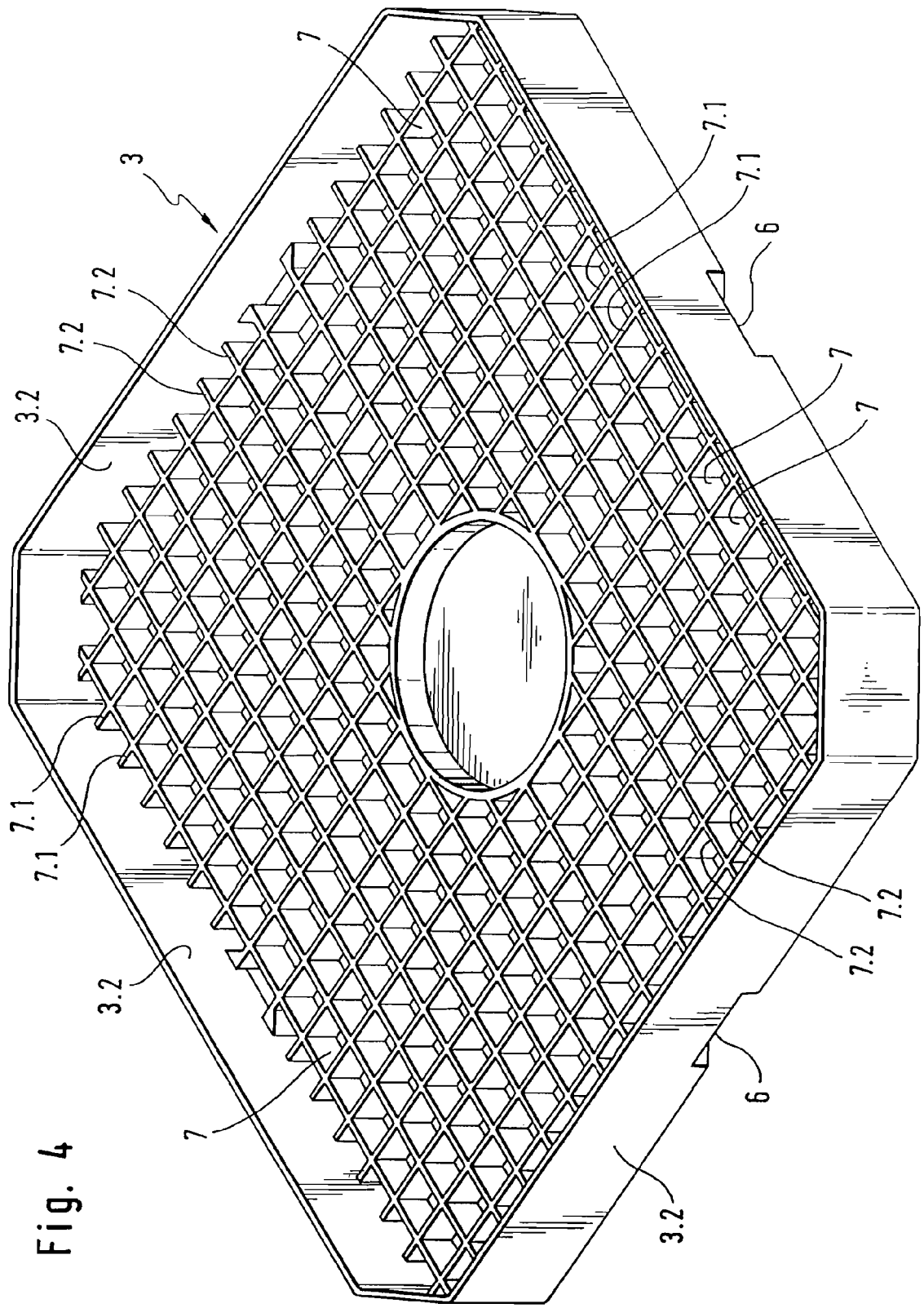
FIGS. 4, 5 plan views of an upper part from the inside.
Figure 5:
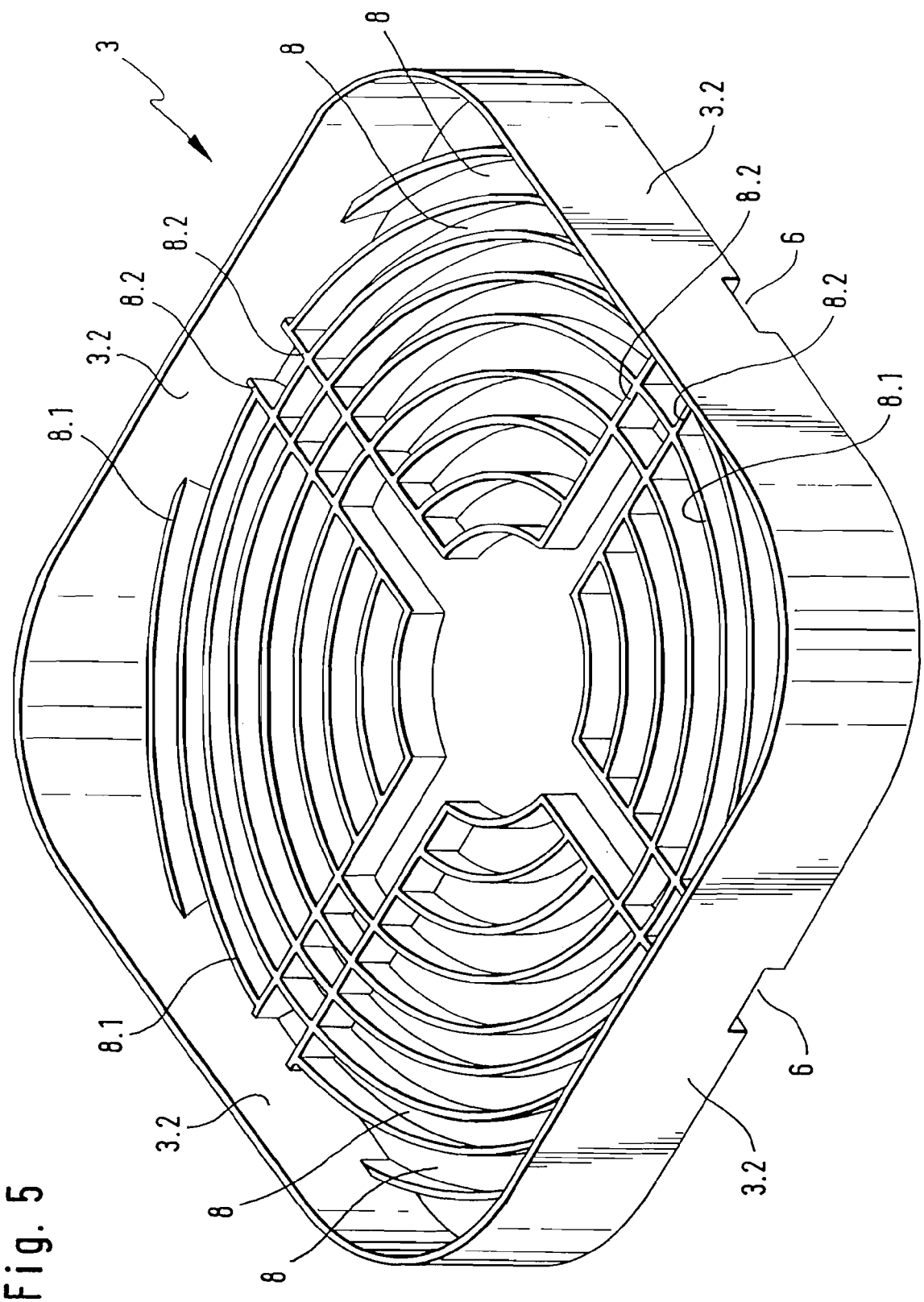

In FIGS. 4 and 5, the inner sides of the upper parts 3 of a package 1 are shown, which are equipped with through holes 7, 8. These are formed in the first case by parallel connecting pieces 7.1, 7.2, which are engaged to each other in longitudinal and transverse rows. The connecting pieces 7.1, 7.2 are connected to the base plate 3.1 of the upper part 3, so that honeycomb-like through holes 7 are formed. In the second case, the through holes 8 are formed by connecting pieces 8.1, which are arranged in a circle, which are spaced apart from each other in the radial direction, and which are connected to connecting pieces 8.2 running parallel to the side walls 3.2 at several circumferential positions. The type and position of the connecting pieces 7.1, 7.2, 8.1, 8.2 are ultimately insignificant, all that matters is that high stability of the part is achieved. FIGS. 4 and 5 show further that in both cases a circular release position 9 is present in the upper part 3.

Figure 6:
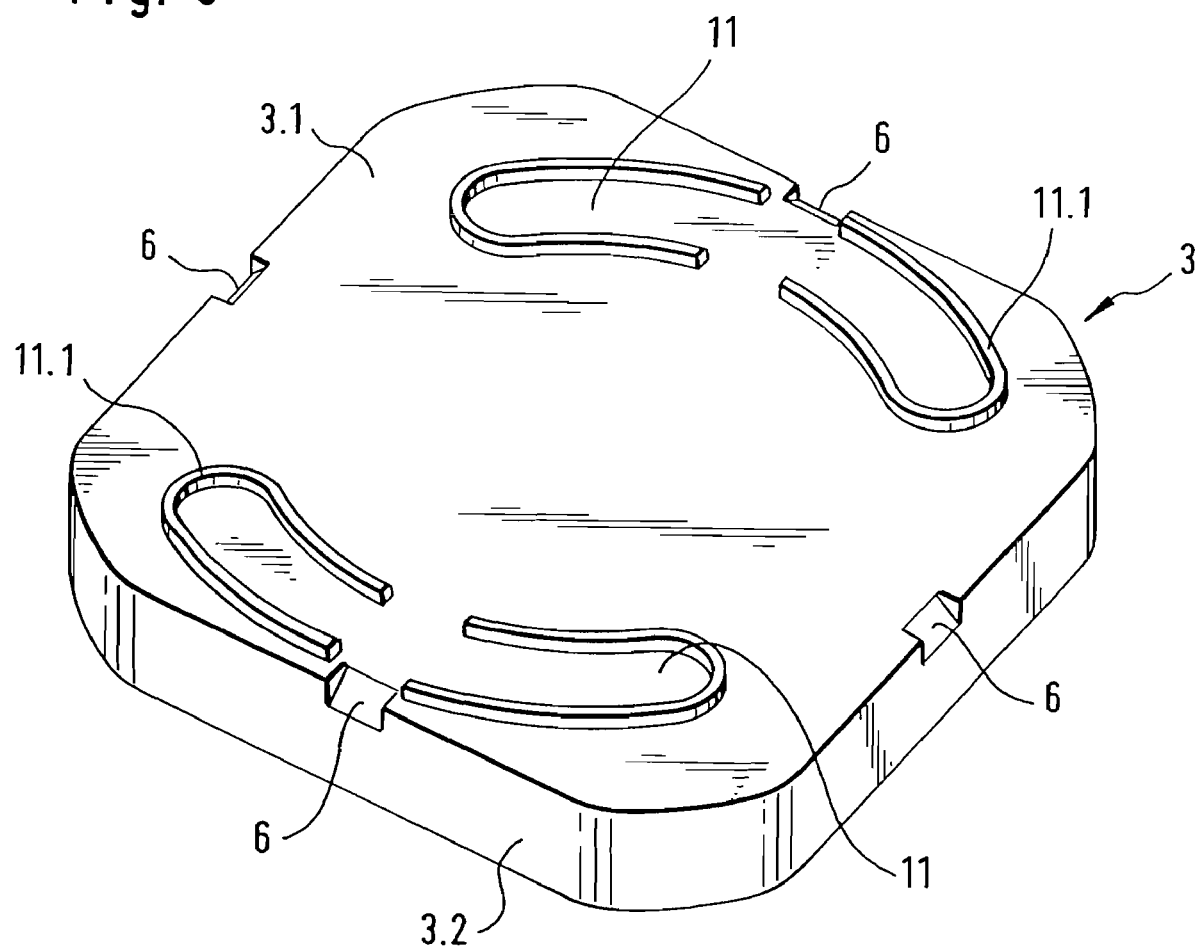
FIG. 6 a plan view of an upper part from above.
Figure 7:
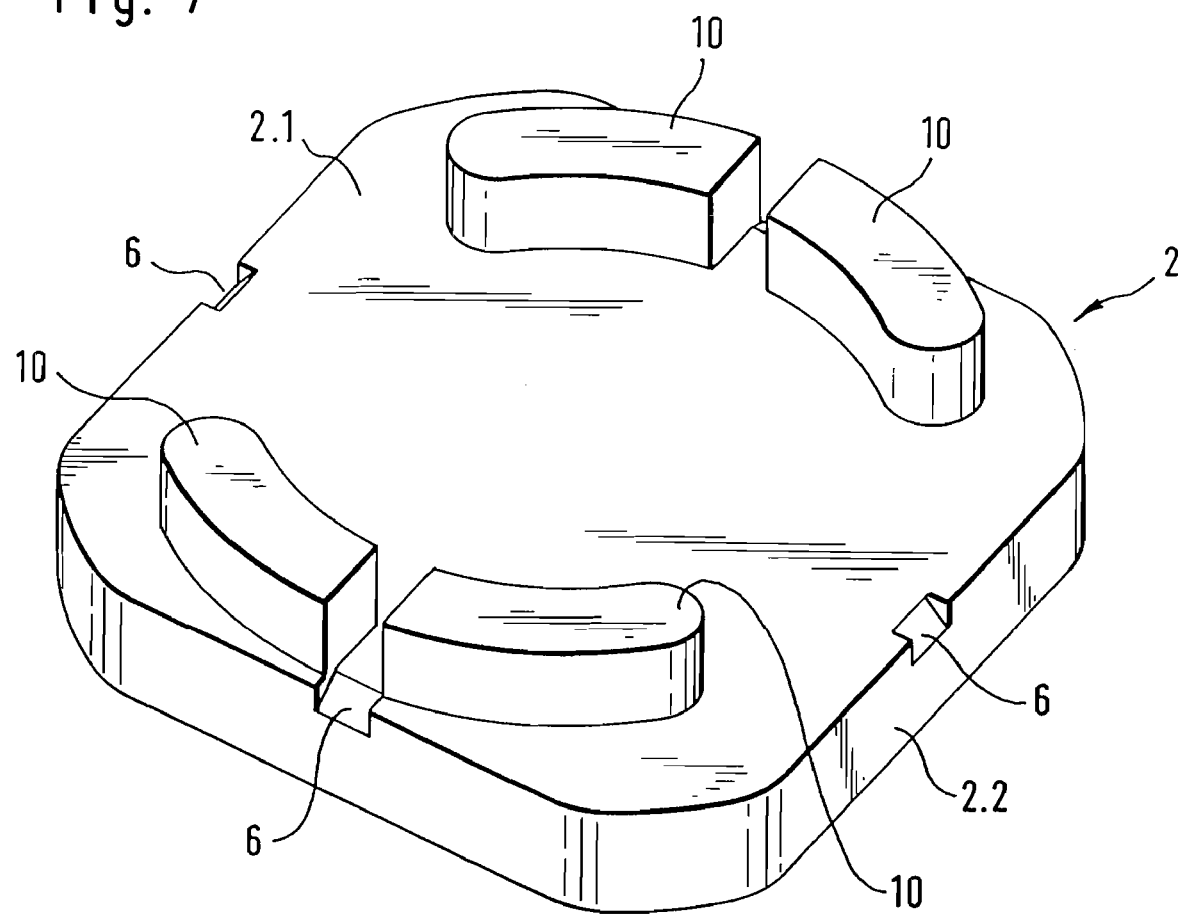
FIG. 7 a plan view of a lower part from below.

In FIGS. 7 and 6, other types of stacking elements are shown, which are composed of the arc-shaped segments 10 that engage in associated recesses 11. The recess 11 is defined by beads 11.1, which enclose the arc-shaped segments 10 and thus prevent slippage.

The actual invention, according to which what matters is making the same packaging reusable for large anti-friction bearings of different dimensions, follows from FIGS. 8 to 13, wherein the holding element shown in FIGS. 10, 10a, 11, 12, and 13 is described first in more detail.

Figure 12:
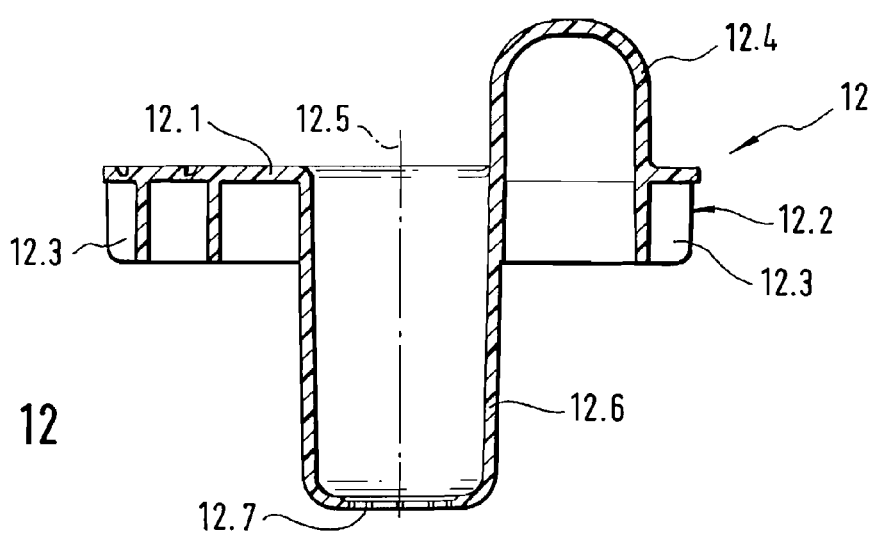
Figure 13:
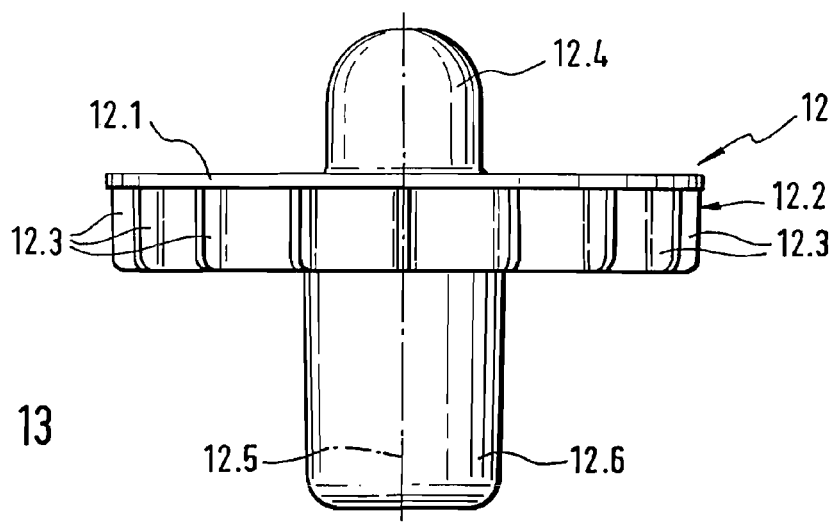

The holding element designated with 12 can be produced in one piece as an injection-molded part in a simple way and is comprised of the circular base plate 12.1, whose outer surface 12.2 is provided with gear teeth 12.3. The pin 12.4, which is positioned offset eccentrically relative to the rotational axis 12.5 of the holding element 12, is arranged on the top side of the base plate 12.1. The bottom side of the base plate 12.1 is provided with the central cylindrical peg 12.6, which extends as the pin 12.4 in the opposite axial direction. As FIGS. 12 and 13 show, this peg 12.6 can be provided with the positive-fit element 12.7 or can be slightly conical on its bottom end. In this way it is prevented that the holding element 12 can fall out from the lower part 2 when a large anti-friction bearing 15 is not inserted. When the holding element 12 rotates about its axis 12.5, the eccentrically offset pin 12.4 moves on a circular path, so that different distances of the pin 12.4 from a center point of the package 1 can be set, as FIGS. 8 and 9 show.

Figure 10:
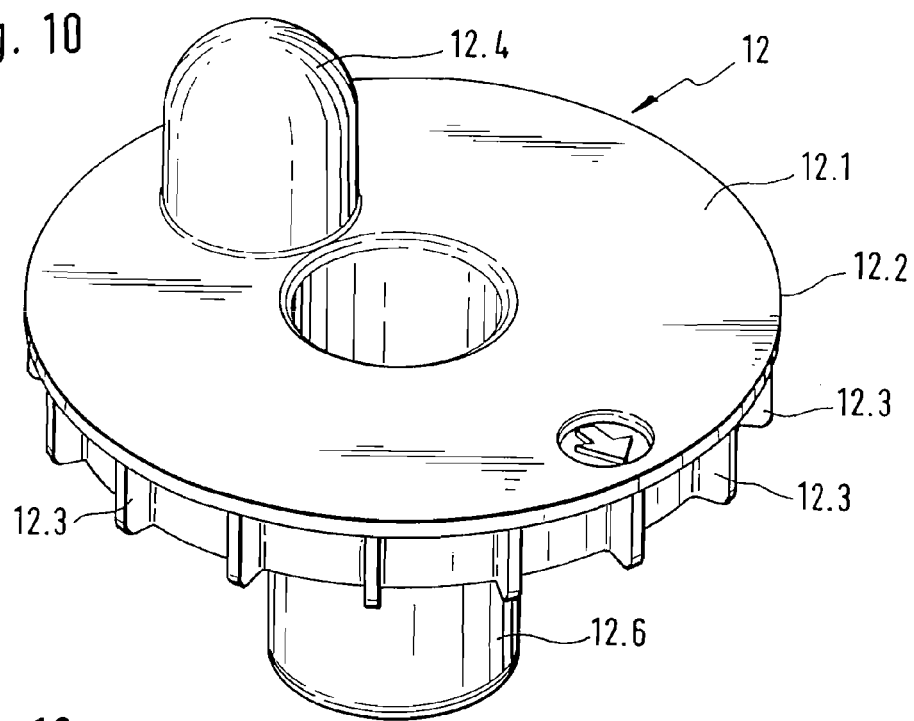
Figure 10A:
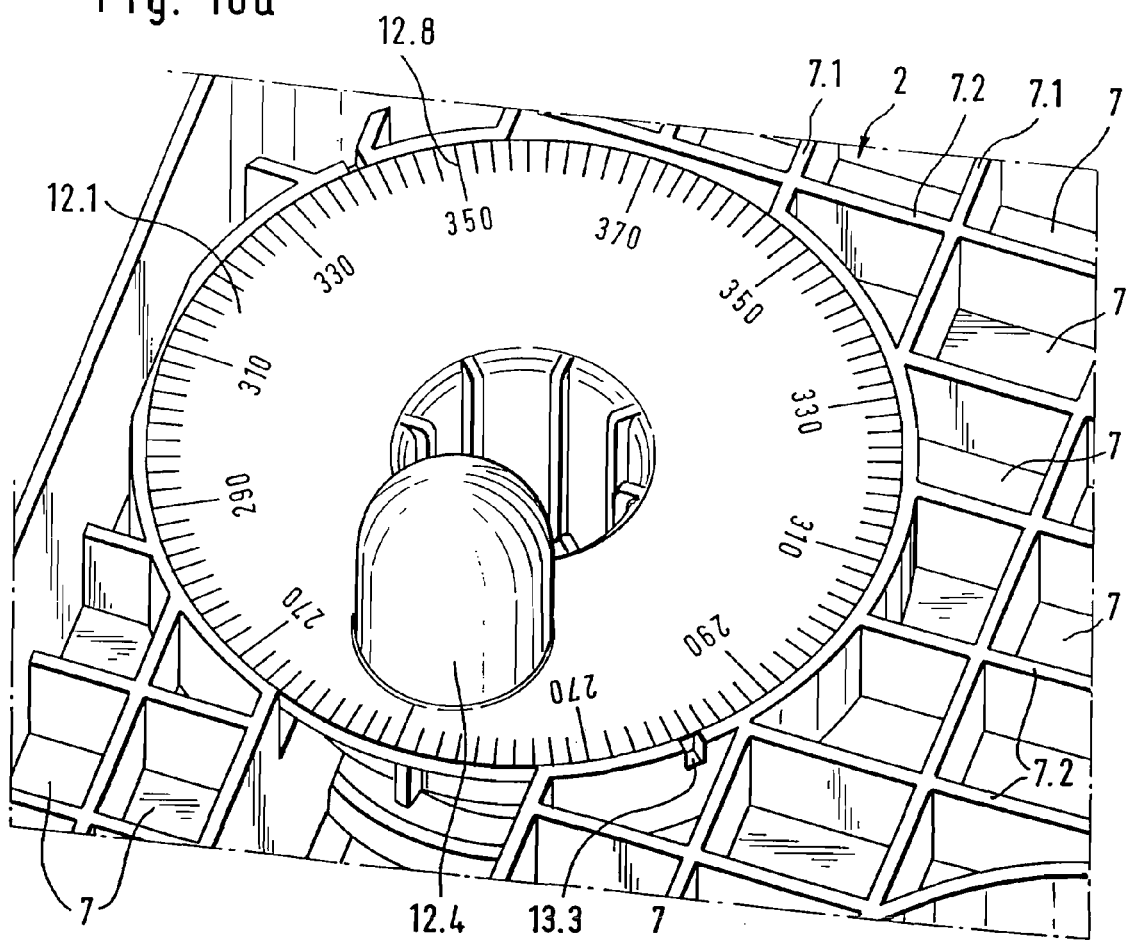
Figure 11:
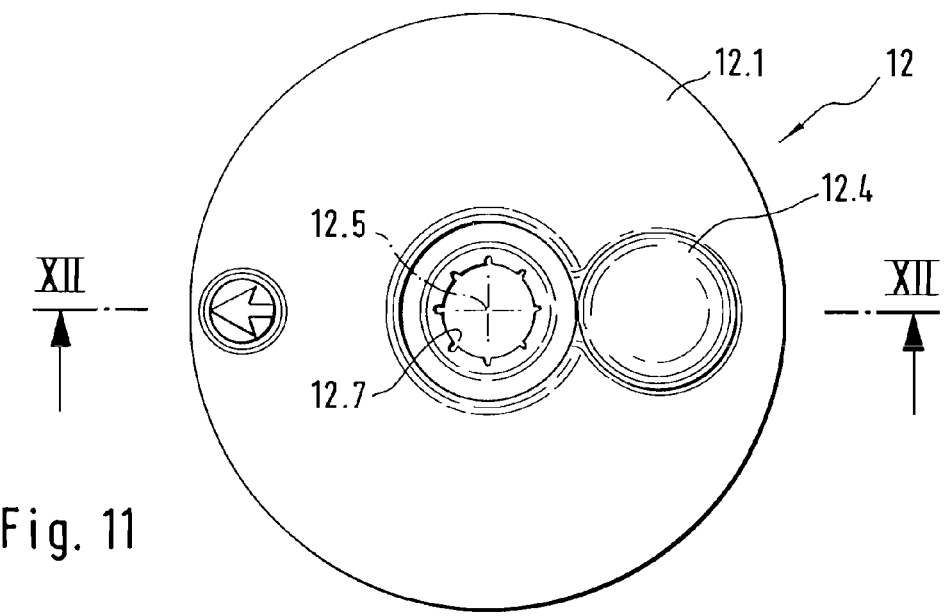

As can be seen from FIG. 10*a*, it is advantageous when the top side of the base plate 12.1 of the holding element 12 is provided with circular scaling 12.8. The specified number values in the range from 270-370 correspond to the diameter of the large anti-friction bearing in mm. If a corresponding value is brought into alignment with the marking 13.3 of the of the side wall 13.1, then the eccentrically offset pin 12.4 of the holding element 12 is in exactly the correct position for contacting the outer surface of the relevant large anti-friction bearing.

Figure 8:
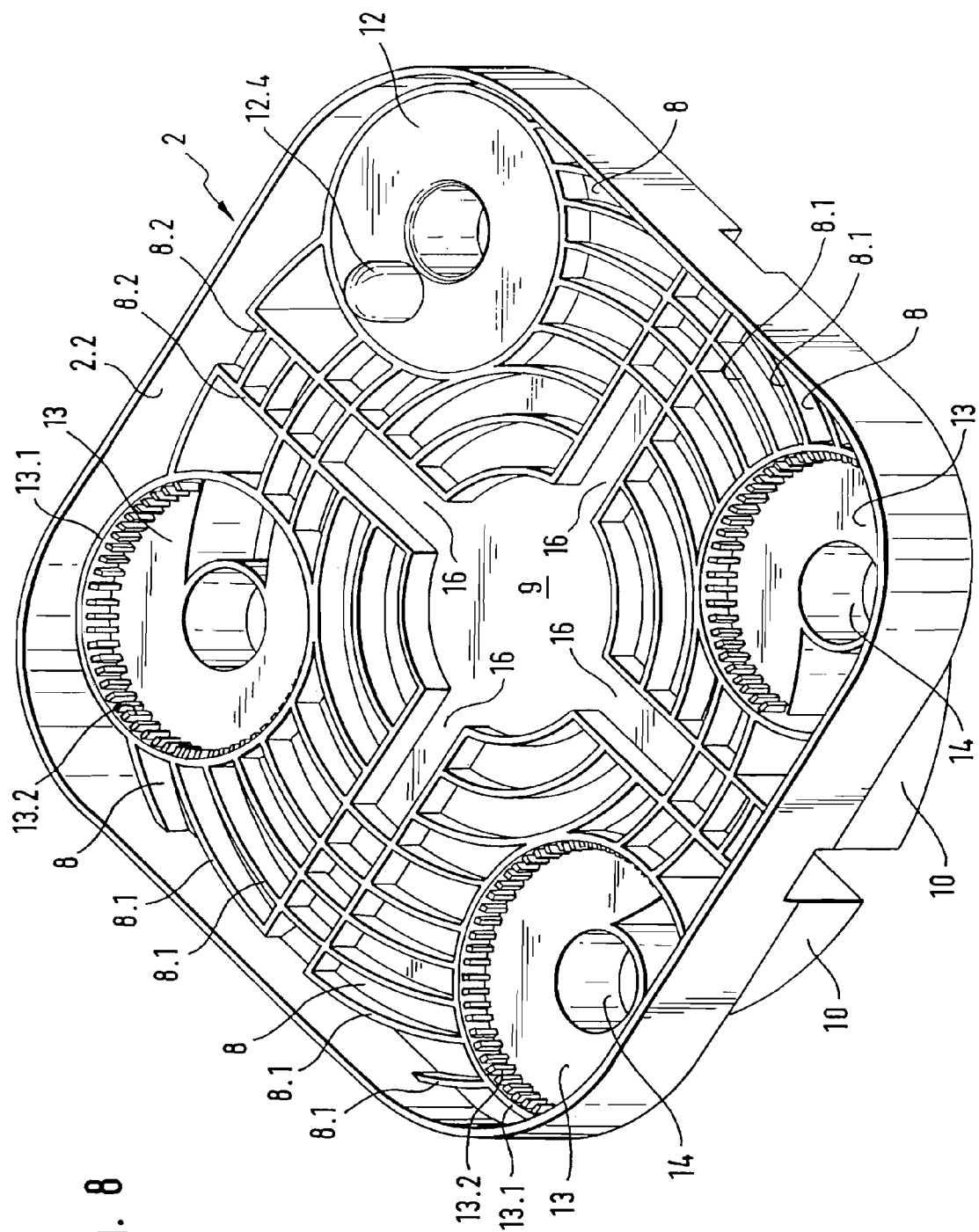
FIGS. 8, 9 a plan view of a lower part with an inserted holding element and with an inserted holding element and bearing, FIG. 10 a perspective view of a holding element, FIG. 10a a plan view of a holding element arranged in the lower part, FIG. 11 a plan view of a holding element, FIG. 12 a cross-sectional view along line XII-XII in FIG. 11, and FIG. 13 a side view of a holding element.
Figure 9:
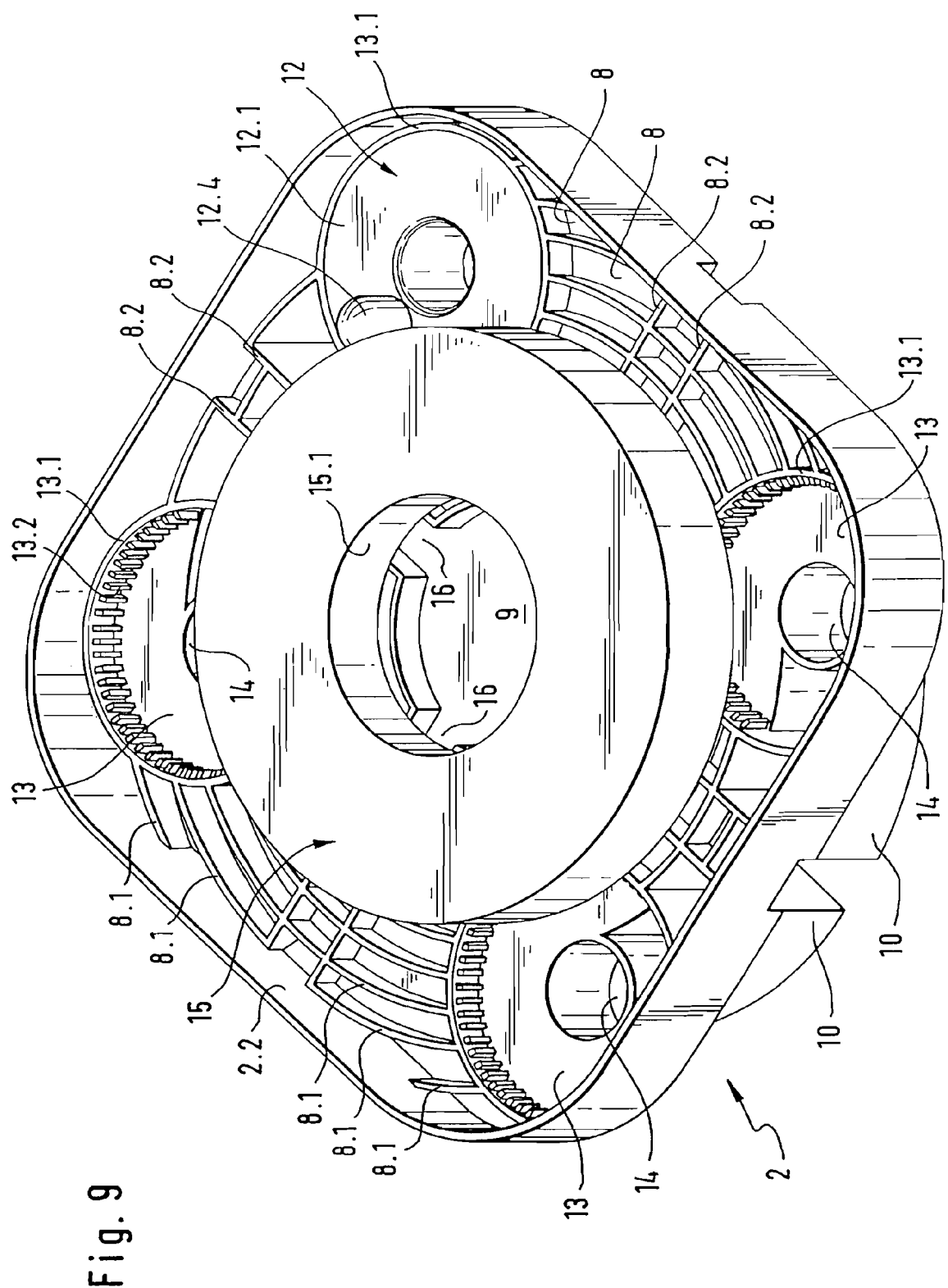

The lower part 2 of the package 1 shown in FIGS. 8 and 9 is provided with through holes 8 for increasing its mechanical stability in the way already described under FIG. 5. For this purpose, the base plate 2.1 is provided with circular connecting pieces 8.1, which are spaced apart from each other in the radial direction and which are connected to connecting pieces 8.2 extending parallel to the side walls 2.2 at four circumferential positions spaced uniformly from each other, wherein the circular release position 9 is formed in the middle. The circular connecting pieces 8.1 are each interrupted in each corner region by a first circular open space 13, which is defined by the side wall 13.1 extending 360°. While the side wall 13.1 is provided with gear teeth 13.2, the first open space 13 is continued by a second open space 14, which is smaller in diameter than the open space 13.

As shown in particular in FIG. 9, the large anti-friction bearing designated with 15 and shown schematically is deposited on the inner side of the lower part 2, so that its inner bore designated with 15.1 is aligned approximately with the release position 9. Before this, the holding element designated with 12 was inserted so that its pins 12.4 arranged offset eccentrically to the rotational axis 12.5 come into contact with the outer surface of the large anti-friction bearing 15. In this way, the large anti-friction bearing 15 is encompassed at four circumferential positions by the pins 12.4, so that it cannot slip, wherein the large anti-friction bearing 15 contacts a part of the base plate 12.1 of the holding element 12. While the holding element 12 is guided with its peg 12.6 in the second open space 14, its base plate 12.1 is housed in the first open space 13. Here, gear teeth 12.3 of the holding element 12 directed outwards in the radial direction engages in the gear teeth 13.2 of the side wall 13.1 directed inwards in the radial direction, so that the holding element 12 is fixed with a positive fit in the first open space 13. Now if the large anti-friction bearing 15 is replaced by a bearing with a larger diameter, then first the first bearing is lifted out, in that a lifting tool is inserted into the gaps 16, which are defined by the straight-line connecting pieces 8.2. Then the holding elements 12 are first removed from the two open spaces 13, 14, in order to then be inserted again so that their pins 12.4 come into contact with the outer surface of the anti-friction bearing 15 with a larger diameter.

From FIG. 9 it can be seen that in the package 1 large anti-friction bearings 15 with different axial widths can also be housed, because the side walls 2.2 of the lower part 2 overlap with the side walls 3.2 of the upper part 3 (not shown) in their height extent. Without an inserted large anti-friction bearing 15, the overlap of the side walls 2.2, 3.2 is at a maximum and it decreases with increasing axial width of the anti-friction bearing 15. In other words, the distance of the base plate 2.1 of the lower part 2 from the base plate 3.1 of the upper part 3 is determined by the axial width of the large anti-friction bearing 15.

At this point it should be noted, in conclusion, that although the previously described embodiments described the packaging of only one large anti-friction bearing, the invention shall also extend to multiple-piece packages. This means that several large anti-friction bearings, which are held in the described way, can then be housed in one packaging unit.

LIST OF REFERENCE SYMBOLS

1 Package
2 Lower part
2.1 Base plate
2.2 Side wall
3 Upper part
3.1 Base plate
3.2 Side wall
4 Stacking element
4.1 Arc-shaped recess
4.2 Projection
5 Recess
5.1 Bead
6 Release position
7 Through hole
7.1 Connecting piece
7.2 Connecting piece
8 Through hole
8.1 Connecting piece
8.2 Connecting piece
9 Release position
10 Stacking element
11 Recess
11.1 Bead
12 Holding element
12.1 Base plate
12.2 Outer surface
12.3 Gear teeth
12.4 Pin
12.5 Rotational axis
12.6 Peg
12.7 Positive-fit element
12.8 Scaling
13 First open space
13.1 Side wall
13.2 Gear teeth
13.3 Marking
14 Second open space
15 Large anti-friction bearing
15.1 Inner bore
16 Gap

The invention claimed is:

1. Packaging for transporting and handling large anti-friction bearings, comprising a lower part and an upper part, which can be stacked one within the other and which define a receiving region for receiving at least one large anti-friction bearing, the large anti-friction bearing receiving region is surrounded by holding elements that can be fixed at several circumferential points spaced apart from each other, the holding elements are detachably connected to the lower part, an eccentrically offset pin is arranged on each of the holding elements on a top side of a circular base plate thereof, while a bottom side of the base plate is provided with a central cylindrical peg, the circular base plate of each of the holding elements is provided on an outer surface with gear teeth, which engage in an associated circular open space of the lower part also provided with gear teeth and a position of the holding elements can be adjusted in such a way that a distance of each of the eccentrically offset pins in relation to a central part of the package can be increased or decreased.

2. Packaging according to claim 1, wherein the holding elements are connected to the lower part with a positive and/or non-positive fit.

3. Packaging according to claim 1, wherein the cylindrical peg of the holding element is provided on an end thereof with a positive-fit element that engages in an associated positive-fit element in the lower part.

4. Packaging according to claim 1, wherein an inner side of at least the lower or the upper part is provided with vertical through holes.

5. Packaging according to claim 1, wherein at least one of the upper or lower part is provided on an inner side thereof with a central release position.

6. Packaging according to claim 1, wherein the lower part is provided on an outer side thereof with protruding stacking elements, which engage in associated recesses arranged on a top side of the upper part.

7. Packaging according to claim 5, wherein the stacking elements are cylindrical and engage in the recesses which are circular.

8. Packaging according to claim 5, wherein the stacking elements are rectangular and have a circular segment-like projection.

9. Packaging according to claim 1, wherein a top side of the upper part and a bottom side of the lower part are provided with release positions for holding a tensioning means.

10. Packaging according to claim 1, wherein the packaging is produced from a plastic that is resistant to lubricant and anti-corrosion agents.

11. Packaging according to claim 10, wherein at least the upper part is produced from a transparent plastic.

12. Packaging according to claim 1, wherein side walls of the lower part and the upper part overlap in their height extent.

13. Packaging for transporting and handling large anti-friction bearings, comprising a lower part and an upper part, which can be stacked one within the other and which define a receiving region for receiving at least one large anti-friction bearing, the large anti-friction bearing receiving region is surrounded by holding elements that can be fixed at several circumferential points spaced apart from each other, the holding elements are detachably connected to the lower part, an eccentrically offset pin is arranged on each of the holding elements on a top side of a circular base plate thereof, while a bottom side of the base plate is provided with a central cylindrical peg, the top side of the circular base plate of each of the holding elements is provided with scaling, which can be brought into alignment with a marking in a side wall of the associated circular open space and a position of the holding elements can be adjusted in such a way that a distance of each of the eccentrically offset pins in relation to a central part of the package can be increased or decreased.

14. Packaging for transporting and handling large anti-friction bearings, comprising a lower part and an upper part, which can be stacked one within the other and which define a receiving region for receiving at least one large anti-friction bearing, the large anti-friction bearing receiving region is surrounded by holding elements that can be fixed at several circumferential points spaced apart from each other, the holding elements are detachably connected to the lower part, an inner side of at least one of the lower or the upper part is provided with vertical through holes, the through holes are formed by parallel connecting pieces, which are arranged in longitudinal and transverse rows relative to each other and a position of the holding elements can be adjusted in such a way that a distance of each of the holding elements in relation to a central part of the package can be increased or decreased.

15. Packaging for transporting and handling large anti-friction bearings, comprising a lower part and an upper part, which can be stacked one within the other and which define a region for receiving at least one large anti-friction bearing, the large anti-friction bearing receiving region is surrounded by holding elements that can be fixed at several circumferential points spaced apart from each other, the holding elements are detachably connected to the lower part, an inner side of at least one of the lower or the upper part is provided with vertical through holes, the through holes are formed by connecting pieces, which are arranged in a circular shape and which are spaced apart from each other in a radial direction, wherein connecting pieces extending parallel to one side edge are arranged at least at one circumferential position and a position of the holding elements can be adjusted in such a way that a distance of each of the holding elements in relation to a central part of the package can be increased or decreased.

* * * * *